United States Patent [19]

Brown et al.

[11] Patent Number: 4,764,316
[45] Date of Patent: Aug. 16, 1988

[54] PROCESS FOR PREPARING SOLID PROPELLANT GRAINS USING THERMOPLASTIC BINDERS AND PRODUCT THEREOF

[75] Inventors: Ernie D. Brown, Pleasant View; Karl M. Nelson; Gary L. Smith, both of Ogden, all of Utah

[73] Assignee: Morton Thiokol, Inc., Chicago, Ill.

[21] Appl. No.: 903,003

[22] Filed: Sep. 2, 1986

[51] Int. Cl.$^4$ .................. C06B 21/00; C06B 45/10; C06D 1/08; F42B 3/00

[52] U.S. Cl. ....................... 264/3.1; 86/20.1; 86/20.12; 86/20.14; 102/287; 102/291; 149/19.92; 149/109.6; 264/3.4

[58] Field of Search .............. 264/125, 3.1, 3.4; 149/19.9, 21, 42, 76, 109.6, 113, 19.92; 86/20.1, 20.11, 20.12, 20.13, 20.14, 20.15, 30; 102/287, 291

[56] References Cited

U.S. PATENT DOCUMENTS

| | | | |
|---|---|---|---|
| 435,842 | 9/1890 | Lumm | 149/19.9 |
| 925,419 | 6/1909 | Bichel | 149/19.9 |
| 1,812,172 | 6/1931 | Rohn | 264/3 R |
| 2,361,382 | 10/1944 | Camin | 22/200 |
| 2,425,005 | 8/1947 | Rechel | 86/30 |
| 3,202,730 | 8/1965 | Gordon et al. | 264/3 R |
| 3,396,215 | 8/1968 | Hittinger | 264/3 R |
| 3,655,836 | 4/1972 | Dehm et al. | 264/3 C |
| 4,025,591 | 5/1977 | Pendergast | 264/3.4 |
| 4,088,518 | 5/1978 | Kehren et al. | 264/3.4 |
| 4,361,526 | 11/1982 | Allen | 264/3 C |
| 4,405,534 | 9/1983 | Deisenroth | 264/3.4 |
| 4,450,124 | 5/1984 | Christmann et al. | 264/3.1 |

OTHER PUBLICATIONS

Pollard et al. 1966 Aerospace Ordnance Handbook, Prentice-Hall, Inc., Englewood Cliffs, N.J., p. 436.

Primary Examiner—Stephen J. Lechert, Jr.
Assistant Examiner—Howard J. Locker
Attorney, Agent, or Firm—Wayne E. Nacker; Gerald K. White

[57] ABSTRACT

Thermoplastic elastomer particulates, oxidizer particulates, fuel particulates, plasticizers and other propellant formulation ingredients are mixed to produce a dry blend. The dry blend is tightly packed into a rocket motor casing or mold. The dry blend is then heated in place, beginning at the bottom and continuing upward, to fuse the thermoplastic elastomer. During fusion, vacuum and mechanical compaction pressure are used to eliminate interstices. Upon cooling, a solid propellant grain is produced.

4 Claims, 2 Drawing Sheets

DRY BLEND/MELT SAMPLE
30X

EXTRUDED SAMPLE
30X

PROCESS FOR PREPARING SOLID PROPELLANT GRAINS USING THERMOPLASTIC BINDERS AND PRODUCT THEREOF

The present invention relates to solid propellant grains or the like and more particularly to a process of preparing propellant grains comprising thermoplastic binders and suspended solid particulates.

BACKGROUND OF THE INVENTION

Conventional solid composite propellants have binders which utilize cross-linked elastomers in which prepolymers are cross-linked by chemical curing agents. As outlined in detail in U.S. Pat. No. 4,361,526, there are important disadvantages to cross-linked elastomers. Cross-linked elastomers must be cast within a short period of time after addition of the curative, which time period is known as the "pot life". Disposal of a cast cross-linked propellant composition is difficult, except by burning, which poses environmental problems.

As an alternative to cross-linked elastomer binders, U.S. Pat Nos. 4,361,526 proposes to use a thermoplastic elastomeric binder which is a block copolymer of a diene and styrene, the styrene blocks providing a meltable crystalline structure and the diene blocks imparting rubbery or elastomeric properties to the copolymer. In order to prepare a propellant composition using the copolymer, the copolymer is dissolved in an organic solvent, such as toluene, and the solids and other propellant formulations components are added. The solvent is then evaporated, leaving a rubbery solid which may be divided into pellents suitable for casting or other processing.

A disadvantage of formulating a propellant using a thermoplastic elastomeric binder which must be dissolved in a solvent is that the propellant grain cannot be cast in a conventional manner, e.g., into a rocket motor casing. Furthermore, solvent-based processing presents problems with respect to solvent removal and recovery. Organic solvents, such as toluene, present certain hazards both to the immediate work area and to the larger environment, necessitating various precautions to be taken with respect to processing such propellant formulations.

It has also been proposed to produce thermoplastic elastomeric propellants in which the solid particulates and thermoplastic elastomer are fused in a high-shear mixer or extruded and the fused mixture poured or extruded into a casing or mold. There are important disadvantages with such techniques. Because of the high-solids loading of propellant formulations, viscosities tend to be quite high, making mixing difficult and, in many cases, impossible on a large scale. Localized overheating in high-shear apparatus may cause instability in a high-energy formulation. As will be described in greater detail hereinafter, casting techniques which rely on flow, e.g., pouring or extrusion, generally result in an undesirable anisotropic orientation of particulates.

There exists a need for improved processes for producing propellant grains with thermoplastic elastomeric binders, and particularly for processes which can be scaled up to produce even the largest rocket motors.

SUMMARY OF THE INVENTION

In accordance with the present invention solid propellant grains for rockets or the like are prepared from a dry mix or blend of thermoplastic elastomer particulates and energetic particulates. The dry blend is melted in place in a rocket motor casing or mold. Thermoplastic elastomer particulates are prepared, e.g., by cryogenic fragmentation, and homogeneously mixed with energetic particulates, including solid fuel particulates and/or solid oxidizer particulates. The particulates are selected with a particle size distribution to meet formulation requirements and to achieve close packing of the particulates. The mold or casing is filled with the dry blend of particulates, and mechanical means, such as vibration, tamping, etc., are employed to ensure close packing of the solid particulates. Thereafter, the packed blend is heated to the melting temperature of the thermoplastic in a manner that provides for melting of the thermoplastic elastomer from the bottom to the top of the packed material. During fusion, the blend is maintained under vacuum to draw air from the intersticies, while at the same time, the blend is subjected to mechanical pressure from above to press the particulates and molten thermoplastic elastomer together and force air therefrom. Subsequently, the fused blend is allowed to cool and solidify into a propellant grain. The fused propellant grain is machined, as necessary.

DETAILED DESCRIPTION OF CERTAIN PREFERRED EMBODIMENTS

Figure 1:
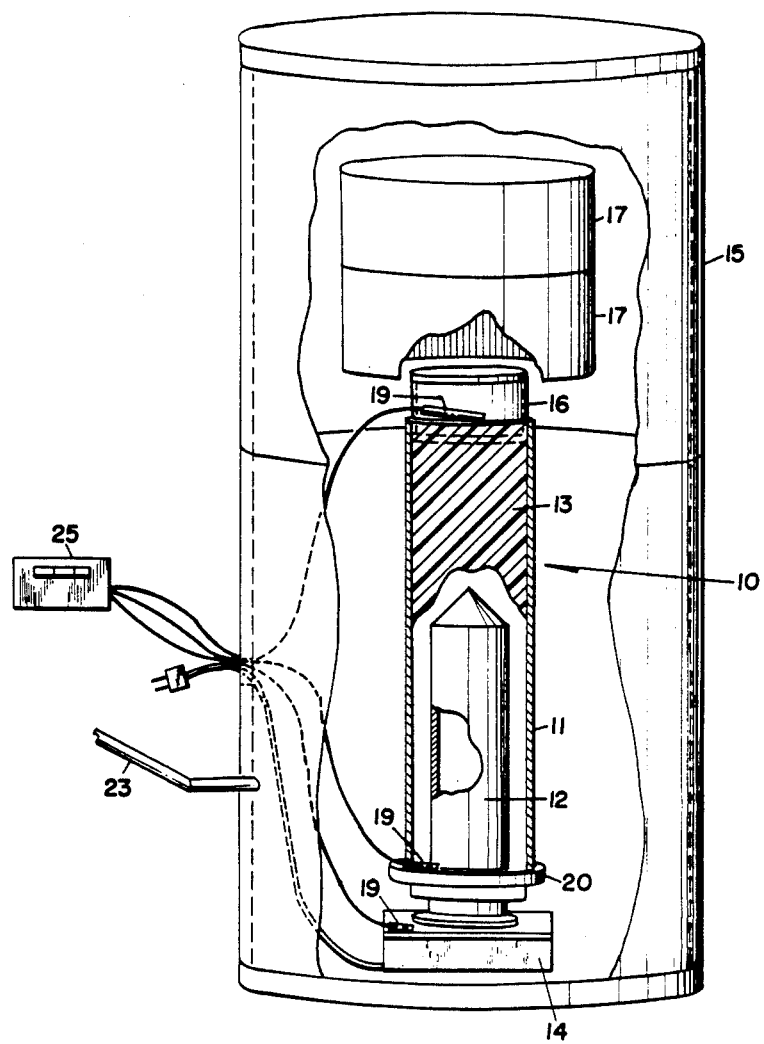
FIG. 1 is a diagrammatic view illustrating fusion of a center-perforated 5" diameter propellant grain in accordance with the process of the present invention.

The present invention is directed to a practical process for providing a cast propellant grain in which a thermoplastic elastomer serves as the basis of the binder system which carries dispersed solid particulates. Although it is recognized that thermoplastic elastomer binders have numerous inherent advantages relative to cross-linked polymer binders, various constraints of thermoplastics elastomers and propellant systems have generally precluded there being a practical process of casting thermoplastic elastomeric binder propellant grains. Important constraints relate to the temperature range at which thermoplastic elastomers must be processed for use in a propellant, and the high viscosities of thermoplastic elastomers in the processing temperature range. Constraints further pertain to the high-solids loading required of a propellant formulation, e.g., 75% and upward, and the instability of the energetic particulate solids. Thermoplastic elastomers useful as propellant binders generally must have melting temperatures above about 150° F. to 160° F. (65° C. to 71° C.) in order that the propellant grain not melt at the highest ambient temperatures to which it might be subjected (including temperatures somewhat higher than air temperature, resulting from solar energy-absorption). Processing of a propellant formulation must generally be carried out below about 300° F.–350° F. (149° C.–177° C.) so that the energetic materials, such as fuel particulates, oxidizer particulates and plasticizers do not destabilize with potentially catastrophic results.

Within the working temperature range, substantially any potentially suitable thermoplastic elastomer is too viscous to simply flow into the interstices of packed particulates in the manner that nitroglycerine flows into the interstices of nitrocellulose pellets in the preparation of double-base propellants. The high solids loading of propellant formulations and high viscosities of molten thermoplastic elastomers provide for very high-viscosity molten propellant formulations, presenting problems with respect to high-shear processing, such as high-shear batch mixing, particularly with respect to large batches or continuous processes. High-shear processing of highly viscous formulations potentially results in localized temperatures above the stability points of various components of a propellant formulation and is generally considered too risky.

Other considerations of a process for producing a cast propellant grain are to ensure that the propellant grain is uniform, both in density and in solids loading in order to provide a uniform, predictable burn. It is further desired that the solid particulates in a propellant grain have as isotropic an orientation as possible to ensure predictable burn characteristics of the propellant grain. Almost any casting process which relies upon a flow of binder-solids composition tends to orientate the particulates, and generally all propellant cast, e.g., vertically in a cylindrical mold or casing, exhibit particulate orientation, resulting in a differential burn rate which is higher in the direction parallel to the flow direction than in the direction perpendicular to the flow direction. Experimental evidence indicates that the burn rate in the parallel-to-the-flow direction generally ranges from about 1% to 12% above that of the burn rate in the perpendicular-to-the-flow direction. In order to minimize the effects of anistropic particulate orientation, propellant formulations are typically cast into rocket motor casings through dispersion cones; however, localized anomolies may still occur, resulting in unpredictable burn characteristics.

The present invention is directed to a method of fabricating a propellant comprising a thermoplastic binder and energetic particulates in a manner that ensures a high-density propellant grain with energetic particulates uniformly distributed and isotropically oriented. The propellant is fused at a temperature above the melting point of the thermoplastic elastomer and below temperatures at which destabilization might occur and with assurance that no localized heating to excess temperature will occur.

Generally, in accordance with the invention, a dry blend of thermoplastic elastomer particulates and energetic particulates is prepared, and the dry blend is packed into a rocket motor casing or mold in a manner that ensures high-density packing of the blend. Thereafter, the blend is heated within the casing or mold to above the melting temperature of the thermoplastic, fusion of the blend proceeding from the bottom upward. As the blend is heated, it is simultaneously subjected to vacuum and to mechanical compacting pressure to draw air from the blend as it fuses and to compress the blend as it fuses to ensure a high density of the fused propellant grain. After the entire blend has been fused, it is allowed to cool to ambient temperature and thereby solidify to a solid propellant grain. Generally, some machining of the fused grain is required; for example, because the dry blend/melt process requires overfilling of the mold or casing.

Fusing, beginning with the bottom of the packed blend while evacuating air and mechanically compressing the blend helps to ensure substantially complete evacuation of air, thereby yielding a high-density fused propellant grain. Because the blend of homogeneous material distribution is fused in place, the resulting solid propellant grain has uniform density and uniform solids loading. Because the process avoids any pouring or extrusion of molten or liquified mass, particulate orientation is substantially completely isotropic. As a consequence, we expect propellants produced in accordance with the invention have burn rates in both the perpendicular and parallel directions which are substantially equal, e.g., less than about 0.5% different. As directional burn rate differential is eliminated, burn rate consistency from one propellant grain to another is achieved, in contrast to flow-cast processes where different flow conditions differentially affect the performance of each particular propellant grain.

A wide variety of thermoplastic elastomers might be used as propellant binders, providing they have suitable melting points, e.g., between about 150° F. and about 350° F. Thermoplastic elastomers having melting points on either side of this range might have application in particular situations. For examples, if it is known that the propellant will not be exposed to high ambient temperatures, a thermoplastic elastomer having a lower melting point may be used; if the energetic particulates used in a particular formula are stable at higher-than-usual temperatures, a thermoplastic elastomers having a higher melting temperature may be processed in accordance with the invention. Thermoplastic elastomers for binders are also selected according to mechanical properties, inherent energies, cost, etc. Thermoplastics suitable for binders include, but are not limited to polyamides, polyester, 1,2 syndiotatic butadiene, styrene-diene tri-block polymer, multiblock polyurethane, and mixtures thereof. An important advantage of the present invention is that because processing requirements for thermoplastic elastomers are not particularly critical, various inexpensive tars may serve as propellant binders. Inexpensive tars frequently have inherent energies comparable to high-cost, cross-lined binders which are commonly in use.

Implicit in the process of the invention is the need for particulates of the thermoplastic elastomer. Particulates may be obtained by fragmentation of larger pieces of thermoplastic elastomer resin. Fragmentation may be achieved by shattering a thermoplastic elastomer below its glass transition temperature ($T_g$), e.g., in a cryogenic grinder. The fragments may be sorted according to size, e.g., with sieves of various meshes, and incorporated in the blend according to a size or size distribution which helps to ensure close packing of a dry blend. Thermoplastic elastomer particulates of a wide range of sizes may be used, ranging from those having weight mean diameters under a micron to those having weight mean diameters up to several centimeters or more. Preferably, however, the thermoplastic elastomer particulates have weight mean diameters that range from about 10 microns up to about 1 mm, and more preferably, the particulates have weight mean diameters less than about 1/10 mm to help ensure uniform distribution of the particulates.

The size distribution of the thermoplastic elastomer particulates is selected according to the size distribution of the energetic particulates, including fuel particulates and/or oxidizer particulates, to promote close packing of the dry blend. A dry blend packing 90%, preferably 95%, and more preferably 98% of theoretical density is generally sought. The size distribution of the energetic particulates, including both oxidizers and fuel, are selected to achieve a particular burn rate.

Other methods of providing thermoplastic resin particulates are also contemplated by this invention, including, for example, spray drying or particle atomization. The choice of particulate-producing method will depend upon the nature of the thermoplastic elastomer and the size of the particulates desired. In some cases, thermoplastic elastomer particulates of appropriate size are obtainable directly from the vendor.

Energetic particulates are selected from energetic materials that are commonly used in propellant formulations. Particulate aluminum is a common fuel material. Common oxidizers include ammonium perchlorate (AP), cyclotrimethylene trinitramine (RDX) and cyclotetramethylene tetranitramine (HMX). High-loading of energetic solids is a generally sought-after attribute of propellant formulations, propellant formulations having a solids content of at least about 75 weight percent generally being used and even up to about 92 weight percent being achieved. The balance of the propellant grain consists essentially of the binder system.

The binder system comprises the thermoplastic elastomer and optionally comprises a plasticizer or plasticizers appropriate to the thermoplastic elastomer to provide elasticity and flexibility thereto. The plasticizer may comprise up to about 70 wt. percent of the binder system (thermoplastic elastomer plus plasticizer) and up to about 18 wt. percent of the propellant charge.

The propellant charge optionally includes minor amounts of additional components, such as processing aids, burn rate modifiers, etc., which are known in the art.

The particulates, including the thermoplastic elastomer particulates, the energetic particulates and the plasticizers (which are typically in liquid form but used at a relatively low percent of the total formulation) are added to a dry mixer and blended to achieve a homogeneous distribution of components. Suitable mixers for providing dry blends are substantially lower in cost than high-shear mixers, representing a capital cost reduction available by fabricating propellant grains according to the method of the invention. The low-shear mixers do not generate appreciable amounts of heat in the blend during mixing and therefore do not melt the thermoplastic elastomer, but rather provide a homogeneous blend of particulates. Examples of suitable mixers are ribbon blenders, twin shell (Vee) blenders, continuous blenders and solid pre-heating blenders. The dry blend may be immediately used to pack a propellant mold or casing or may be stored and/or shipped without any significant shift from homogeneity.

The dry blend is packed into a mold or casing at ambient temperatures. To ensure a dense propellant grain, the dry blend is preferably compacted as it is packed. Various mechanical means, such as tamping or pneumatic vibration, may be used to compact the blend in the mold or casing. The dry blend is packed to the desired level of the propellant grain in the mold or casing and to somewhat above in order to accommodate the shrinkage which occurs as air is evacuated from the interstices during the fusion process. In packing a dry blend, unlike pouring or extruding a liquified thermoplastic or uncured propellant formulation, substantially no preferential particulate orientation occurs.

To ensure that the homogeneous distribution of thermoplastic elastomer, energetic particulates and other ingredients, which is achieved in the dry blending process, is carried over to the fused propellant grain, fusion is begun at the bottom of the packed mass of dry blend and proceeds upward therefrom. If melting were to occur first upward of unfused particulates, there would be a tendency for some of the molten thermoplastic elastomer to flow into the intersticies of the unfused particulates below, resulting in non-homogeneity of the fused grain.

By initiating fusion at the bottom and continuously eliminating air-filled voids as fusion proceeds upward, there do not exist interstices into which newly molten thermoplastic elastomer can flow, but rather, the newly molten thermoplastic elastomer remains with the energetic particulates to which the thermoplastic elastomer particulates are closely adjacent in the dry blend. It is to be appreciated, that in some instances, e.g., in fabricating very small grains, fusion may be carried out throughout all of the blend at once.

Although a dense, dry blend is achieved, dry blends inherently include interstices. These interstices are preferably removed by a combination of subjecting the dry blend to vacuum during the fusion process and mechanically pressurizing the blend, e.g., from above, during fusion. To remove air from the dry blend, the vacuum is preferably maintained at less than about 10 inches of mercury absolute pressure and more preferably at less than about 2 inches of mercury absolute pressure. Generally, the vacuum is maintained at between about ½ and about 2 inches of mercury absolute pressure, although this may vary considerably according the thermoplastic elastomer used, the particulate size distribution and the density requirements of the fused propellant grain. Vacuum alone is often considered insufficient to achieve the requisite density in the fused propellant grain, and accordingly, the mechanical pressure is used to compact the blend during fusion. The mechanical pressure helps to both force air from the interstices and to press the material together to eliminate the interstices as the air is evacuated. The mechanical pressure may be provided, for example, by adding weights or with a pneumatic piston. Generally, a mechanical compacting pressure of at least about 5 psi and preferably a mechanical pressure of at least about 15 psi is used.

It is to be understood that in some cases either high vacuum alone or mechanical pressure alone is sufficient to minimize interstices. In some cases, particularly where grain density is not considered to be particularly important, a propellant grain might be produced without resorting to compaction during fusion.

The heat to fuse the dry blend from the bottom upward may be provided by a variety of means, including a direct heat source, such as an electrical heater or heated oil bath; a microwave heater; an ultrasonic heater; a steam heat exchanger; an induction heater; etc. For fusing a small propellant grain, a heat source may be placed at the bottom of the packed dry blend, whereupon fusion occurs at the bottom of the blend and proceeds upward as a result of conductive transfer of heat. For fusing larger propellant grains, reliance on a source of bottom heat may be impractical from standpoints of time efficiency and energy utilization efficiency; and a heat source, e.g., a movable heat source, may be employed to fuse progressively higher levels of the packed, dry blend. If the vertical dimension of the grain being formed is sufficiently great, it is permissible for lower levels of the fused blend to cool and solidify even as upper levels are being fused, providing that no interface or discontinuity of fusion results.

After fusion is complete, the fused blend is allowed to cool and solidify. Generally, no special cooling apparatus is required; rather, the fused propellant is exposed to ambient temperatures to provide relatively gradual solidifying. If the thermoplastic elastomer expands or contracts to any substantial degree during solidifying, special measures may be taken to ensure that cooling is uniform and expansion or contraction is thereby uniform.

Generally, some machining of the cast propellant grain is required after solidification. This is particularly true of the upper end of the cast propellant because the casing or mold must be overfilled to provide for shrinkage. It is, of course, conceivable that careful measurement of dry blend can avoid any excess of material, but providing a slight excess of dry blend and then machining the cast grain is generally preferred. Additional machining of the cast propellant grain may be used to further shape the same, e.g., to provide a configuration which is difficult to obtain by casting alone or to provide means of attaching the propellant grain to other mechanical parts of the rocket motor.

An important advantage of the method of the present invention is that the dry blend/melt process requires less energy than high-shear mixing, and the energy required to melt the thermoplastic elastomer is less than that required to cure or cross-link a chemically active thermoset propellant. Although the fusion temperature of the thermoplastic elastomer propellant formulation may be higher than typical cure temperatures of cross-linked elastomers, the time required for fusion is substantially less than that generally required for curing; thus, the total amount of heat energy used to form the thermoplastic elastomer propellant grain is substantially reduced relative to that used to cast a cross-linked propellant grain.

Various aspects of the invention will now be described in greater detail by way of specific examples.

EXAMPLE 1

The dry blend/melt process in accordance with the invention is illustrated with respect to FIG. 1, showing apparatus by which a 5" diameter, inert propellant grain was manufactured. The solids used is particulate KCl for the purpose of experimental safety; however, it is felt that this inert material provides excellent analogy to casting using energetic particulates, and initial testing using inert materials is an accepted practice in the art. The thermoplastic used is a polybutadiene-based thermoplastic sold under the trade designation RB-820 by the Japanese synthetic rubber compound. The M.P. of this material is about 180° F. (82° C.). The polymer was cryogenically ground to achieve a weight mean particulate diameter of about 131 microns. The thermoplastic particulates plus (DOA) plasticizer and KCl were homogeneously blended at a 25:75 weight ratio in a V-shell blender.

The mold 10 comprised a cylindrical 5" ID sidewall 11 and a 3" diameter cylindrical protuberance 12 for providing a center perforation extending 12 inches upward from a base 20. The dry blend 13 was loaded into the mold 10 with tamping during loading to achieve a 15 inch vertical pack of dry blend. The blend-filled mold 10 was placed on a hot plate 14 within a chamber 15 connected to a vacuum line 23. To compress the blend 13, a hollow cylinder 16 having a 5" OD was placed on the blend at the top of the mold, and 200 lb of weight 17 was placed on the hollow cylinder 16. Thermocouple probes 19 were placed at various locations, including the hot plate 14, the base 20 of the mold 10 and within the hollow cylinder 16 and connected to a digital readout 25. Blend 13 was placed under a vacuum of 0.5-inch Hg absolute pressure and heated for a period of 5 hours, during which period the mold base 20 was heated to a final temperature of about 350° F. (177° C.) and the temperature in the hollow cylinder 16 rose to about 210° F. (99° C.). Thereafter, heating was terminated, and the temperature of both the base 20 and the cylinder 16 equilibrated to 110° F. (43° C.), yielding a solid cast propellant grain.

Conventional procedures were utilized to remove the cast propellant from the mold subsequent to cycle completion. The total cycle time of 8 hours for liquifying and solidifying the blend compares with conventional 5 to 15 day propellant cure times.

EXAMPLE 2

Figure 2B:
FIGS. 2A and 2B are photographs provided to show comparison of solids orientation in a propellant grain of an inert propellant formulation fabricated by extrusion (2A) and grains of the same inert propellant formulation fabricated by the process of the present invention (2B).
Figure 2A:
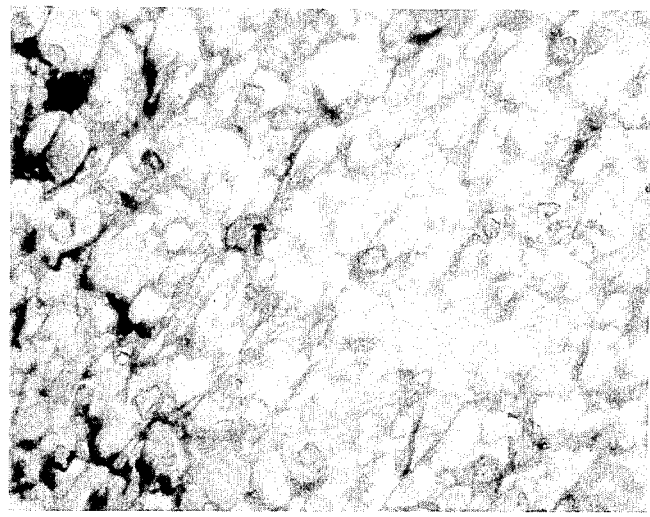

A mixture identical to that used to prepare the inert propellant grain in FIG. 1 was extruded vertically into strands. Sections were taken of the propellant produced by dry blend/melting and compound within the extruded strands. FIG. 2A is a 30× photograph of the extruded propellant grain and FIG. 2B is a 30× photograph of the dry blend/melt propellant grain. Whereas there is distinct solids (KCl) orientation in the extruded sample, the dry blend/melt sample is substantially isotropic.

EXAMPLE 3

Sections were taken from the top, middle and bottom of the propellant grain produced by the dry blend/melt process in Example 1. Total solids percent and density in grams per cubic centimeter were measured. The results are given in Table 1 below.

TABLE 1

|  | Top | Middle | Bottom |
|---|---|---|---|
| Total Solids (%) | | | |
|  | 74.435 | 74.628 | 75.207 |
|  | 74.867 | 74.016 | 75.037 |
|  | 74.387 | 74.789 | 75.161 |
| Mean | 74.563 | 74.481 | 75.135 |
| SD | 0.264 | 0.411 | 0.088 |
| 95% Confidence Range | 0.656 | 1.021 | 0.219 |
| Density (gm/cm$^3$)* | | | |
|  | 1.513 | 1.512 | 1.526 |
|  | 1.514 | 1.511 | 1.518 |
|  | 1.516 | 1.510 | 1.526 |
| Mean | 1.514 | 1.511 | 1.523 |
| SD | 0.0015 | 0.001 | 0.005 |
| 95% Confidence Range | 0.004 | 0.002 | 0.012 |

*Theoretical density = 1.644 gm/cm$^3$

It can be seen that the densities and solids percent of the top, middle and bottom were all within 1% of the mean, indicating that no meaningful redistribution of material occurred in the fusion cycle.

EXAMPLE 4

The inert propellant grain produced in Example 1 was examined for mechanical properties and compared with similar formulations prepared with high-shear mixing, process A and process B. The data listed in Table 2 below are preliminary data, and the formulations are not necessarily directly comparable. Nevertheless, the data shows that propellant grains prepared by the dry blend/melt-in-place method have mechanical properties in the range of propellant grains produced by high-shear mixing. It should be noted that the propellant grains are inert; thus, localized heating using high-shear mixing did not represent the hazard which it would present in active propellant grains. It is also to be noted that in attempts to step up production, by either process A or B, to gallon size batches failed due to rheostatic considerations. With the dry blend/melt process (Process C) in accordance with the present invention, the size of the batch presents no insurmountable problems.

a compaction force of 36.56 lbs, equivalent to 16.88 pounds per square inch of propellant surface. Steam heat was used. 81 psi steam provided a motor base temperature of 300+/−5° F. A processing time of 3 hours provided a final propellant surface temperature of 148° F. The melt phase did not progress through the entire overcast; however, the motor portion of the casting was completely melted under the above conditions. The compaction force remained in place until the motor was cooled to ambient temperature.

The nine center perforated charges were test fired;

TABLE 2

| Process | Polymer Type | Plasticizer Type | Pl/Po Ratio | Bonding Agent | Solids Level (%) | E (psi) | $\sigma_m$ (psi) | $\epsilon_m$ (%) | $\epsilon_r$ (%) |
| --- | --- | --- | --- | --- | --- | --- | --- | --- | --- |
| Process A | RB810 | DOA | 2 | None | 75 | 38 | 9 | 77 | 85 |
| 1-Pint mixer | RB810 | DOA | 2 | None | 80 | 71 | 9 | 55 | 50 |
| | RB810 | DOA | 2 | KR* | 85 | Gal | 9 | 28 | 29 |
| | RB820 | DOA | 2 | KR* | 85 | 166 | 15 | 16 | 25 |
| | RB820 | DOA | 1 | T/B** | 85 | 2.800 | 43 | 3 | 94 |
| | RB820 | DOA | 1 | None | 85 | — | 44 | 4 | 50 |
| Process B | RB810 | DOA | 1 | None | 85 | 2.851 | 53 | 93 | 96 |
| ⅓ Pint Mixer | RB820 | DOA | 1 | None | 85 | 3.001 | 36 | 13 | 29 |
| Range (Process A and B) | | | | | | 38 to 3,001 | 9 to 53 | 3 to 77 | 25 to 85 |
| Process C | RB820 | DOA | 1 | None | 75 | 840 | 32 | 66 | 70 |

*Kenrich KP P380
**AX-878/880 or Tepanoal/BHEGA
Pl/Po = plasticizer to polymer ratio
E = modulus
$\sigma_m$ = maximum stress
$\epsilon_m$ = maximum strain
$\epsilon_r$ = strain at fracture

EXAMPLE 5

The dry blend/melt-in-place process was demonstrated using live materials. Three batches of formulation number DL-H395 were blended in a vee shell blender. The first batch was 10 lbs net weight; the two subsequent batches were each 8 lbs. The dry blended live material was used in the following test fixtures:

| |
| --- |
| 9 each Subscale Center Perforated Charges (approx 200 grams), |
| 3 each 2 inch Detonation Susceptibility Charges, and |
| 3 each 3 inch Deflegration to Detonation Charges. |

The center perforated charges are designated by Morton Thiokol, Inc. as TU-172 motors. These have the following dimensions:

| | |
| --- | --- |
| Case OD | 1.995 +/− .005 in. |
| Case ID | 1.877 +/− .005 in. |
| Grain Length | 3.38 +/− .02 in |
| Core ID | .875 +/− .001 in. |
| Overcast | 2.0 +/− .50 in. |
| Prop. Weight | 178 +/− 2 grams. |

The formulation of DL-H395 is as follows:

| | |
| --- | --- |
| RB820 | Thermoplastic Elastomer Polymer |
| DOA | Plasticizer (Dioctyl adipate) |
| Aluminum | Fuel (spherical 30 micron mean particle diameter) |
| AP (200 micron) | Oxidizer (Amonium Perchlorate) |
| AP (20 micron) | Oxidizer (Amonium Perchlorate) |

The apparatus used to fuse the grains was substantially as shown in FIG. 1; however, an insulating blanket was placed around the mold, reducing fusion time by about half. A vacuum of 5 to 10 mm Hg absolute pressure was used during melt down, accompanied with data for two of them follow:

| Nozzle dia. in. | Burn Time (sec.) | Ave. Press. (psi) | Burn Rate (in./sec.) | *Kn |
| --- | --- | --- | --- | --- |
| .188 | 3.260 | 566 | .153 | 509 |
| .180 | 3.800 | 540 | .131 | 555 |

*Kn - Initial Surface to Throat Area Ratio, i.e. the initial propellant burning surface area divided by the initial nozzle throat area.

The other seven motors gave extraneous results.

All detonation susceptibility pipes detonated, indicating that the unconsolidated dry blend can be detonated. Two of the three deflegration to detonation pipes detonated, indicating that the unconsolidated propellant can progress from a deflegration to a detonation.

Several advantages of the process of the present invention relative to other processes of propellant grain fabrication can now be more fully appreciated. As noted above, the use of thermoplastic elastomers rather than cross-linked elastomers avoids the problems associated with pot-life and cure time. Not only can thermoplastic propellant grains be recycled as opposed to cross-linked propellant grains, but defects of thermoplastic propellant grains may be corrected by melting localized portions of the grain. In vacuum casting of large, cross-linked solid rocket motors, a high propellant level rise rate is required such that entrained bubbles are collapsed by increasing hydrostatic head prior to the cross-linked elastomer reaching the gel stage; in the process of the present invention, rise rate is not a consideration. Casting of a cross-linked propellant grain cannot be interrupted for long periods of time or discontinuous interfaces will result in the propellant grain. With thermoplastic elastomer propellant formulations, the process can be interrupted at any stage; even interfaces which are produced by interruption of fusion can be corrected by remelting the grain at any such interface.

The dry blend/melt-in-place method may be used to form rocket motors which are too large to be cast by conventional techniques. Studies have shown that boosters for heavy lift vehicles are too big to be cast by conventional methods. Many of the logistical problems are obviated by the dry blend/melt-in-place method which allows the dry blend to be prepared at a remote location and shipped as a dry blend to the site of fabrication of the large rocket motor.

The process of the present invention is advantageous relative to other processes of producing thermoplastic propellant grains. The need for high-shear mixers or extruders is eliminated, making the process inherently much safer, and minimizing capital costs. Furthermore, it is estimated that labor costs are about one half that of processes using high-shear apparatus, due to less preparation and clean-up time. Because there is no flow direction, particulate orientation is isotropic.

While the invention has been described in terms of certain preferred embodiments, modifications obvious to one with ordinary skill in the art may be made without departing from the scope of the invention. For example, it may be advantageous, in certain cases, to produce blocks of propellant material and to fabricate a rocket motor by building up cast blocks within a mold or casing and then remelting the cast block structure in place. This technique may be preferred in cases where the material is to be transported great distances because cast blocks having relatively small surface areas are less subject to detonation than are dry blends of particulates.

Various features of the invention are set forth in the following claims.

What is claimed:

1. A process for fabricating a propellant grain comprising
   providing energetic particulates, particulates of a thermoplastic elastomer and additional components of a propellant grain formulation, said high-energy particulates and said thermoplastic elastomer particulates being together selected of a size distribution to enable a dry blend packing of at least about 90% of theoretical density to be achieved,
   mixing said particulates and said additional components below the melting temperature of said thermoplastic elastomer to produce a dry blend in which said components are homogeneously distributed,
   packing said dry blend into a casing or mold,
   fusing said dry blend in place within said casing or mold by heating said dry blend to above the melting temperature of said thermoplastic elastomer but at a temperature sufficiently low to ensure stability of energetic components of said blend, said packed dry blend being heated from the bottom upward to fuse said packed dry blend from the bottom upward, whereby said homogeneous distribution is maintained throughout fusion and solidification, said packed blend being subjected to vacuum during fusion to draw gases from interstices of said packed blend, mechanical compaction force being applied to said packed blend during fusion, and
   cooling said fused blend to solidify the same.

2. A process in accordance with claim 1 wherein said vacuum during fusion is at about 10 in. Hg or less, absolute pressure.

3. A process in accordance with claim 1 wherein a mechanical compaction force of at least about 5 psi is applied to said packed blend during fusion.

4. A process in accordance with claim 1 wherein said dry blend is packed directly into a rocket motor casing and fused and cooled therein.

* * * * *